SELF-CLEANING ASH TRAY

Original Filed Sept. 5, 1961 2 Sheets-Sheet 1

INVENTOR
ARCHIBALD M. McKENZIE
By Hugo Ray
Agent

SELF-CLEANING ASH TRAY

Original Filed Sept. 5, 1961 2 Sheets-Sheet 2

INVENTOR
ARCHIBALD M. McKENZIE
BY Hugo Ray
Agent

United States Patent Office

Re. 26,092

Reissued Sept. 20, 1966

26,092

SELF-CLEANING ASH TRAY

Archibald M. McKenzie, West Vancouver, British Columbia, Canada, assignor to Sherman Development Ltd., Vancouver, British Columbia, Canada, a corporation of British Columbia Original No. 3,095,108, dated June 25, 1963, Ser. No. 135,917, Sept. 5, 1961. Application for reissue June 4, 1965, Ser. No. 461,569

12 Claims. (Cl. 220—20.5)

Matter enclosed in heavy brackets [ ] appears in the original patent but forms no part of this reissue specification; matter printed in italics indicates the additions made by reissue.

This invention relates to improvements in ash trays of the mechanical type and amongst the objects of the invention are the provision of a device which will clear itself of unsightly and often odorous debris such as cigar or cigarette butts and the like.

Further objects are to provide means whereby the mechanism is triggered in response to, say, a cigarette being butted against the tray and to impose a delay on the actual start of the operating cycle so that the butt may be thoroughly extinguished before being cleared from the tray.

A further object is to provide means for automatically terminating the operation of the device as each cleaning cycle is completed and so that the several parts of the device are positioned ready to be set in motion by manually operated means.

A further and important object is to ensure that the ash receiving tray is wiped completely clear of debris during each operating cycle.

These and further objects will appear in the following specifications and be shown in the accompanying drawings.

Referring to the drawings.

In the drawings like characters of reference indicate corresponding parts in each figure.

Figure 1:
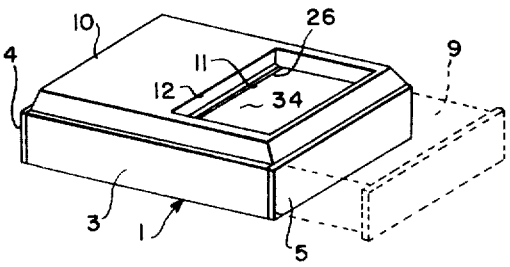
FIGURE 1 is a perspective view of the invention.

The numeral 1 indicates a casing having a bottom wall 2, side walls 3, a rear wall 4 and a front wall 5. Inwardly projecting prongs 7 on the wall 4 engage the side walls 3 to releasably secure said wall to the casing. The wall 5 is secured to a receptacle 9 which is slidably mounted in the casing and is adapted to be completely removed therefrom. The several casing parts are preferably of an electrically non-conducting material such as plastic or the like.

Fitted to the casing is a cover 10 which is supported on the side walls 3. Adjacent the front wall, the cover has a rectangular opening 11 which is bordered by a downwardly projecting flange 12.

Figure 3:
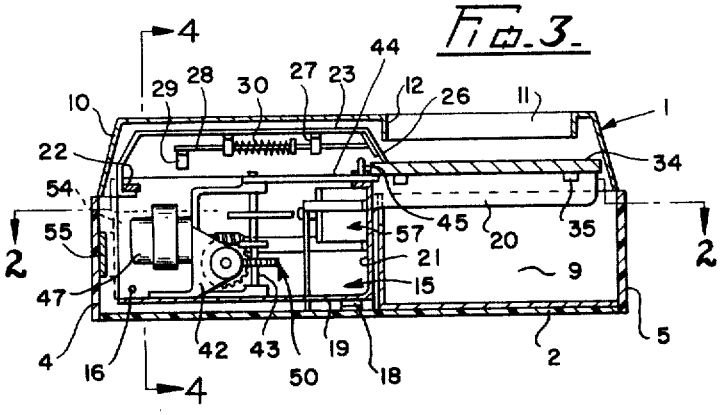
FIGURE 3 is a longitudinal section taken on the line 3—3 of FIGURE 2.

The casing 11 encloses a metal frame 15 which has limited rocking movement about trunnions 16 carried by the side walls 3. A transversely extending leaf spring 18 is secured to the base 19 of the frame and normally supports said frame in a horizontal position. The sides 20 of frame 15 are connected by a central partition 21 and are preferably reduced in height to the right of said partition as viewed in FIGURE 3. A cross bar 22 on the rear of the frame 15 supports a T-shaped arm 23 which extends forwardly to the vicinity of the opening 11.

The arm 23 is fitted with a flexible scraper blade 26 which is secured along its upper edge only. Beneath the arm 23 a pair of bearings 27 slidably support a plunger 28 having a downwardly turned end portion 29. A spring 30 encloses the plunger between one of the bearings 27 and a collar 31, which spring normally supports the front end of the plunger in contact with the scraper blade 26.

Slidably mounted on the top edges of the sides 3 is a rectangular plate 34 which has depending lugs 35 to support it against lateral displacement. The top surface of the plate is preferably highly polished and is engaged by the lower edge of the scraper blade. A horizontal flange 37, having a slot 38, extends from the left edge 39 of the plate.

Figure 2:
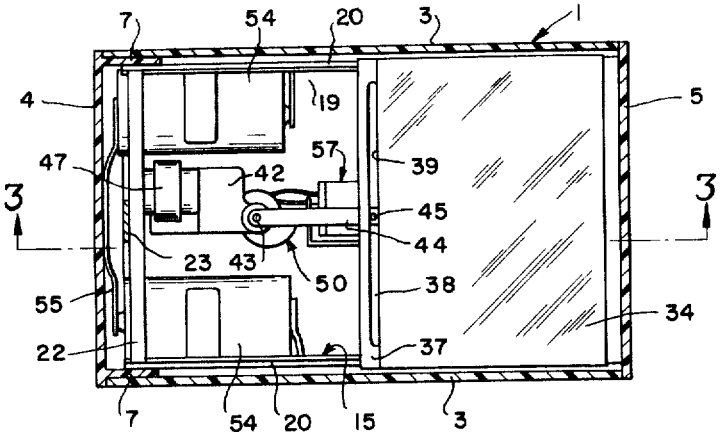
FIGURE 2 is a sectional plan taken on the line 2—2 of FIGURE 3.

Mounted on the frame 15 is a bracket 42 which journals a vertical spindle 43. The spindle is fitted at its upper end with a horizontally disposed crank 44 having a vertical pin 45 at its free end which extends through the slot 38. Supported on the bracket 42 is a small electric motor 47 having a drive shaft 48. As shown best in FIGURE 7, the bracket also supports a suitable reduction gear train which is indicated by the numeral 50. This train includes a worm 51 on the shaft 48 and a gear 52 on the spindle 43, and through said train the motor 47 is adapted to rotate the crank 44 in a clockwise direction as viewed in FIGURE 2.

The motor 47 is powered by a pair of flashlight batteries 54 and said batteries are connected in series by means of a contact bar 55 which is carried by the rear wall 4 of the casing. Included in the motor circuit 56 is a timer 57 which is mounted on the partition 21 in opposition to the spindle 43.

Figure 8:
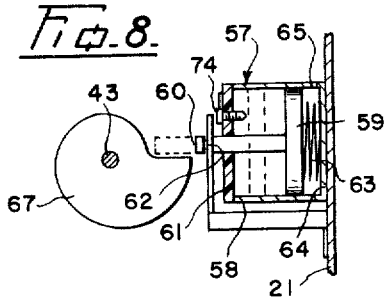
FIGURE 8 is a sectional plan of the timer.

In FIGURE 8, the timer is shown to consist of a cylinder 58 which is fitted with a piston 59 having a rod 60. The rod 60 projects through the head 61 of the cylinder and is provided near its outer end with an annular groove 62. A coil spring 63 is interposed between the piston 59 and the end 64 of the cylinder and adjacent said end the cylinder's peripheral wall has a metered aperture 65. Aligned with the piston rod 60 is a reset cam 67 which is mounted on the spindle 43.

Figure 9:
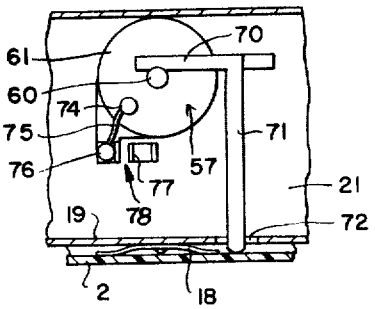
FIGURE 9 is an elevation of the timer, part in section.

The piston 59 is normally supported in the cylinder, against the pressure of the spring 63, by a resilient latch 70 which is secured to the partition 21. The latch seats in the piston rod groove 62 and has a leg 71 which extends downwardly through an opening 72 in the base 19 of the frame and into contact with the bottom wall 2, of the casing, see particularly FIGURE 9.

Figure 7:
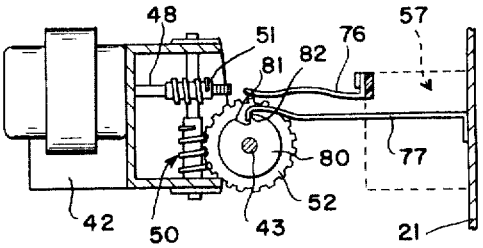
FIGURE 7 is a sectional plan of the motor drive train and associated parts.
Figure 6:
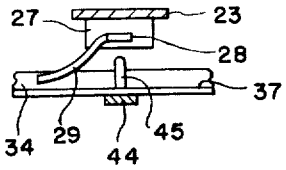
FIGURE 6 is an end view of the plunger engaged by the plate.
Figure 5:
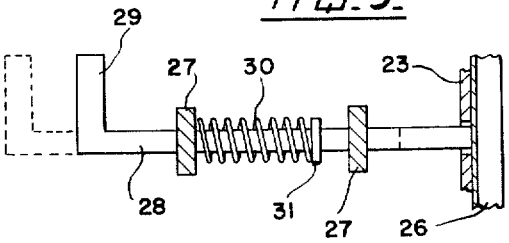
FIGURE 5 is a sectional plan of the plunger.
Figure 10:
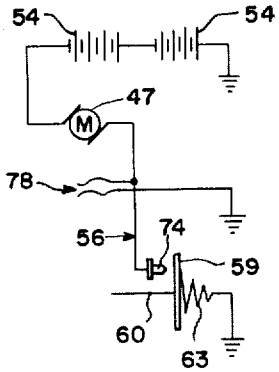
FIGURE 10 is a wiring diagram.
Figure 4:
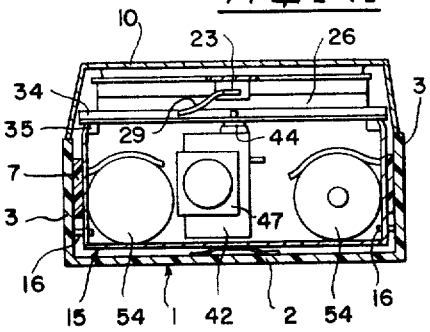
FIGURE 4 is a transverse section taken on the line 4—4 of FIGURE 3.

Extending through the cylinder head 61 is a stud 74 which is electrically connected as at 75 to a contact 76. A second contact 77 extends rearwardly from the partition 21 and with the contact 76 forms a normally open switch 78. The spindle 43 is fitted with a cam disc 80 having a recess 81 on its peripheral edge and, as shown in FIGURE 7, the hooked end 82 of the contact 77 normally is lodged in said recess.

The mechanical ash tray is adapted to be automatically set in motion when a cigarette or the like is pressed against the plate 34 as most smokers do to extinguish a butt. This action results in the frame 15 being rocked about the trunnions 16 so as to compress the spring 18. Since the leg 71 of the timer latch rests upon the bottom wall of the casing, the rocking movement of the frame raises said latch and releases the piston 59.

The released piston is moved along the cylinder 58 by the spring 63 with its rate of motion being determined by the strength of the spring and the size of the metered aperture 65. After a predetermined interval the piston engages the stud 74 to complete the circuit 56 and energizes the motor 47. As the spindle is rotated by the motor, the crank *or reciprocating means* 44 withdraws the plate from *its original position adjacent to and blocking* [beneath] the opening 11 and the blade 26, in contact with the top surface of the plate, wipes the debris therefrom so that it drops into the receptacle 9.

As the plate approaches the rear wall 4 of the container, the edge 39 engages the portion 29 of the plunger and retracts it to compress the spring 30 and to place said portion in the path of travel of the pin 45. The pin engages the portion, raising and releasing it from the edge so that the plunger shoots forward and strikes the wiper blade a sharp blow. This clears the blade 26 of ash and other clinging particles which might otherwise stick to the blade, and the plate *which is in its open position* is then free to return to its original position without picking up traces of ash. *The plate therefore has a cleaning stroke when it moves from its original position to its open position and a return stroke when it returns to its original position.*

The completely extended piston rod is disposed in the dotted line position of FIGURE 8 and an abutment with the edge of the reset cam 67. As this cam is rotated by the spindle, the piston is forced into the cylinder and the latch 70 again engages the groove 62 and resets the timer for the next cycle of operation.

As the piston rod 60 is forced away from the spindle 43 by the action of the reset cam, the piston disengages the stud and breaks the circuit 56 at this point. However, before this takes place, the cam disc 80, which also rotates with the spindle, has moved the contact 77 into engagement with the contact 76 and the electric motor continues to operate. When the spindle 43 has been rotated through 360°, the recess 81 is again disposed in a position to receive the end 82 of the contact 77 which then snaps into said recess to open the switch 78.

In the above described manner each time the plate 34 is depressed and the timer 57 is released, the mechanism goes through one cycle of operation. The plate is reciprocated once so that it is wiped clean and returned to its original position. Simultaneously the timer is reset and the circuit 56 is broken. Thus each time a cigarette butt is discarded, the device automatically operates to keep the plate clear of unsightly debris.

Figure 11:
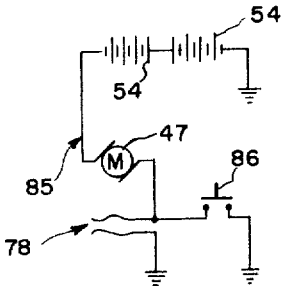
FIGURE 11 is a modified wiring diagram.

[The] *Other means can be used for starting and stopping the plate such as the* circuit 85 of the modification shown in FIGURE 11, *which* includes, in addition to the motor 47, batteries 56 and switch 78, a push button two point make switch 86. This switch is mounted on the exterior of the casing and is adapted to be closed by the smoker after he has deposited a butt and other articles on the plate 34. By momentarily closing the switch 86 circuit 85 is energized to start the motor 47 whereupon the cam disc 80 closes the switch 78 so that the motor continues to operate when the switch 86 is subsequently released. The contact 77 entering the recess 81 on the cam disc, stops the motor as before.

What I claim as my invention is:

1. A self-cleaning ash tray comprising a casing having a top opening, a plate depressably supported in the casing [beneath the] *in an original position adjacent to and blocking said* top opening, said plate being slidably mounted for reciprocatory movement in a horizontal plane *from said original position to an open position where said plate does not block said opening,* a wiper blade engaging the top surface of the plate adjacent a side edge thereof *when said plate is in said original position and cleaning said plate when said plate moves to its open position,* a motor in the casing and having a drive shaft, reciprocating means operatively connecting the drive shaft of the motor to the plate, means for starting the motor in response to downward pressure being applied to the plate and means for stopping the motor as the plate returns to its original position [beneath the] *blocking said* top opening.

2. A self-cleaning ash tray as claimed in claim 1, wherein the starting means includes a timer adapted to delay, for a predetermined interval, the operation of the motor.

3. A self-cleaning ash tray as claimed in claim 1 and means for clearing the wiper blade of accumulated debris at substantially mid-point of the reciprocatory movement of the plate.

4. A self-cleaning ash tray comprising a casing having a top opening, a receptacle removably mounted in the casing below the top opening, a plate interposed between the top opening and the receptacle *when said plate is in its original position,* said plate being mounted for limited movement towards the receptacle and for reciprocatory movement in a horizontal plane *from said original position to an open position,* a wiper blade engaging the top surface of the plate adjacent a side edge thereof *when said plate is in said original position and cleaning said plate when said plate moves to its open position,* a motor in the casing and having a drive shaft, reciprocatory means operatively connecting the motor drive shaft to the plate [whereby] to impart a cleaning stroke and a return stroke to said plate, means responsive to initial downward pressure applied to the plate for starting the motor and means for stopping the motor at the completion of the return stroke of the plate.

5. A self-cleaning ash tray as claimed as claim 4, and means for clearing the wiper blade of accumulated debris prior to the start of the return stroke of the plate.

6. A self-cleaning ash tray comprising a casing having a top opening, a receptacle removably mounted in the casing below the top opening, a plate interposed between the top opening and the receptacle, said plate being mounted for limited movement towards the receptacle and for reciprocatory movement in a horizontal plane, a wiper blade engaging the top surface of the plate adjacent a side edge thereof, a motor in the casing and having a drive shaft, reciprocatory means operatively connecting the motor drive shaft to the plate whereby to impart a cleaning stroke and a return stroke to said plate, means responsive to initial downward pressure applied to the plate for starting the motor, a plunger slidably mounted in the casing, a spring normally urging one end of the plunger into engagement with the wiper blade, said plunger having a portion disposed in the path of the plate and adapted to be engaged thereby to withdraw the plunger, said reciprocatory means including a member for releasing the plunger from engagement with the plate prior to the return stroke of the plunger.

7. A self-cleaning ash tray comprising a casing having a top opening, a normally horizontal frame mounted in the casing for limited rocking movement about a transverse pivot, a plate slidably mounted on the frame beneath the top opening, a wiper blade engaging the top surface of the blade adjacent a side edge thereof, an electric motor mounted on the frame and having a drive shaft, reciprocating means operatively connecting the drive shaft of the electric motor to the plate whereby to impart a cleaning stroke and a return stroke to said plate, a timer having a spring pressed extensible member, a latch normally holding the member in retracted position, said motor having a circuit including a power source, a first switch closable by the member when in extended position and a second switch, means for releasing the latch in response to the frame being rocked about its transverse pivot to initiate the cleaning stroke of the plate and means for opening the second switch at the completion of the return stroke of the plate.

8. A self-cleaning ash tray as claimed in claim 7, said reciprocating means including a vertical spindle and a reset cam on the spindle adapted to return the extensible member to retracted position.

9. A self-cleaning ash tray as claimed in claim 7, said reciprocating means including a vertical spindle, a reset cam on the spindle adapted to return the extensible member to retracted position and a cam disc on the spindle adapted to open the second switch.

*10. A self-cleaning ash tray comprising a casing having an opening, a plate associated with said casing for reciprocatory movement from an original position adjacent to and blocking said opening, to an open position unblocking said opening, a flexible wiper blade engaging the top surface of the plate adjacent a side edge thereof when said plate is in said original position and cleaning said plate when said plate moves from said original position to said open position, wiper blade cleaning means for causing the flexible wiper blade to vibrate and thereby clear the same of accumulated debris and actuator means operatively associated with the plate and the wiper blade cleaning means to actuate said wiper blade cleaning means at a predetermined position of the plate within the span of said reciprocatory movement.*

*11. A self-cleaning ash tray as defined in claim 10, wherein said wiper blade cleaning means clears the wiper blade of accumulated debris at substantially the midpoint of the reciprocatory movement of said plate.*

*12. A self-cleaning ash tray comprising a casing having an opening, a plate associated with said casing for reciprocatory movement from an original position adjacent to and blocking said opening to an open position unblocking said opening, a flexible wiper blade immovably secured at its upper edge and the bottom portion thereof flexibly engaging the top surface of the plate adjacent a side edge thereof when said plate is in said original position, said wiper blade cleaning said plate when said plate moves between said two positions, a motor having a drive shaft located in the casing, said drive shaft of said motor being operatively associated with said plate to drive said plate in said reciprocatory movement, means for starting the motor when said plate is in its original position to move said plate to its open position, means for stopping the motor as the plate returns to its original position blocking said opening, and means operatively associated with the plate and automatically actuated when the plate reaches substantially said open position, said means forcing a first element to abut against a second element and thereby cause the flexible wiper blade to vibrate and clean itself of accumulated debris.*

References Cited by the Examiner

The following references, cited by the Examiner, are of record in the patented file of this patent or the original patent.

UNITED STATES PATENTS

| | | | |
|---|---|---|---|
| 2,426,511 | 8/1947 | La Pointe | 220—20.5 |
| 2,536,078 | 1/1951 | Osborne | 220—20.5 |
| 2,588,537 | 3/1952 | Kelly | 220—205 |

THERON E. CONDON, *Primary Examiner.*

GEORGE E. LOWRANCE, *Examiner.*